(12) United States Patent
Chen et al.

(10) Patent No.: US 9,040,198 B2
(45) Date of Patent: May 26, 2015

(54) ENERGY STORAGE COMPOSITE PARTICLE, BATTERY NEGATIVE ELECTRODE MATERIAL AND BATTERY

(75) Inventors: Jin-Ming Chen, Taoyuan County (TW);
Yen-Po Chang, Changhua County (TW);
Shih-Chieh Liao, Taoyuan County (TW); Chi-Ju Cheng, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 35 days.

(21) Appl. No.: 13/228,454

(22) Filed: Sep. 9, 2011

(65) Prior Publication Data

US 2012/0164531 A1    Jun. 28, 2012

(30) Foreign Application Priority Data

Dec. 24, 2010  (TW) ............................... 99145904 A (51) Int. Cl.
| | |
|---|---|
| *H01M 4/583* | (2010.01) |
| *H01M 4/38* | (2006.01) |
| *H01M 4/133* | (2010.01) |
| *H01M 4/1393* | (2010.01) |
| *H01M 4/36* | (2006.01) |

(52) U.S. Cl.
CPC ............ *H01M 4/133* (2013.01); *H01M 4/1393* (2013.01); *H01M 4/364* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 6,770,399 B2 | 8/2004 | Umeno et al. | |
| 2002/0086211 A1 | 7/2002 | Umeno et al. | |
| 2002/0189400 A1 | 12/2002 | Kodas et al. | |
| 2004/0139886 A1 | 7/2004 | Joedicke | |
| 2006/0134516 A1* | 6/2006 | Im et al. ..................... | 429/218.1 |
| 2008/0286657 A1 | 11/2008 | Hasegawa et al. | |

(Continued)

FOREIGN PATENT DOCUMENTS

| | | |
|---|---|---|
| CN | 1442916 A | 9/2003 |
| CN | 1790779 | 6/2006 |

(Continued)

OTHER PUBLICATIONS

Zheng et al., "Preparation and electrochemical properties of core-shell Si/SiO nanocomposite as anode material for lithium ion batteries", Electrochemistry Communications, vol. 9, Jan. 4, 2007, 886-890.

(Continued)

*Primary Examiner* — Cynthia K Walls
(74) *Attorney, Agent, or Firm* — Jianq Chyun IP Office (57) ABSTRACT

An energy storage composite particle is provided, which includes a carbon film, a conductive carbon component, an energy storage grain, and a conductive carbon fiber. The carbon film surrounds a space. The conductive carbon component and the energy storage grain are disposed in the space. The conductive carbon fiber is electrically connected to the conductive carbon component, the energy storage grain, and the carbon film, and the conductive carbon fiber extends from the inside of the space to the outside of the space. The energy storage composite particle has a high gravimetric capacity, a high coulomb efficiency, and a long cycle life. Furthermore, a battery negative electrode material and a battery using the energy storage composite particle are also provided.

16 Claims, 11 Drawing Sheets

(56) References Cited

U.S. PATENT DOCUMENTS

| | | | |
|---|---|---|---|
| 2008/0318124 A1* | 12/2008 | Horiuchi et al. | 429/199 |
| 2009/0075173 A1* | 3/2009 | Jeong et al. | 429/218.1 |
| 2009/0136847 A1 | 5/2009 | Jeong et al. | |
| 2009/0200518 A1 | 8/2009 | Wagner et al. | |
| 2009/0317720 A1* | 12/2009 | Richard | 429/231.8 |
| 2010/0143798 A1* | 6/2010 | Zhamu et al. | 429/212 |
| 2010/0285359 A1 | 11/2010 | Hwang et al. | |
| 2012/0033317 A1 | 2/2012 | Szita | |

FOREIGN PATENT DOCUMENTS

| | | |
|---|---|---|
| CN | 1909266 A | 2/2007 |
| CN | 101572312 A | 11/2009 |
| CN | 101643864 A | 2/2010 |
| JP | 2005135925 | 5/2005 |
| JP | 2009-032693 | 2/2009 |
| TW | 544972 | 8/2003 |
| TW | I254473 | 5/2006 |
| TW | 200830617 | 7/2008 |

OTHER PUBLICATIONS

Wang et al., "Si, Si/Cu core in carbon shell composite as anode material in lithium-ion batteries", Solid State Ionics, vol. 178, Dec. 13, 2006, 115-118.

Zeng et al., "Nanostructured Si/TiC composite anode for Li-ion batteries", Electrochimica Acta, vol. 53, Sep. 7, 2007, 2724-2728.

"Office Action of Japan counterpart application" issued on Aug. 13, 2013, p. 1-p. 4, in which the listed reference was cited.

"Notice of Allowance of Taiwan Counterpart Application", issued on Jul. 2, 2013, p. 1-p. 4, in which the listed references were cited.

"Office Action of China Counterpart Application", issued on May 15, 2014, p. 1-p. 7, in which the listed reference was cited.

"Notice of Allowance of Japan Counterpart Application," issued on Dec. 9, 2014, p. 1-p. 3, in which the listed references were cited.

* cited by examiner

FIG.17

ENERGY STORAGE COMPOSITE PARTICLE, BATTERY NEGATIVE ELECTRODE MATERIAL AND BATTERY

CROSS-REFERENCE TO RELATED APPLICATION

This application claims the priority benefit of Taiwan application serial no. 99145904, filed on Dec. 24, 2010. The entirety of the above-mentioned patent application is hereby incorporated by reference herein and made a part of this specification.

TECHNICAL FIELD

The disclosure relates to an energy storage composite particle, in particular, to an energy storage composite particle having a specific structure, being capable of storing high capacity and having a good volume expansion/contraction characteristic.

BACKGROUND

Lithium batteries are widely used in notebook computers, mobile phones, digital cameras, video cameras, personal digital assistants (PDAs), Bluetooth headsets, and wireless 3C products.

A negative electrode material of conventional commercial lithium batteries mainly includes a carbon material, such as mesocarbon microbeads (MCMBs) having a capacity of 310 mAh/g and artificial graphite having a capacity of 350 mAh/g. However, the negative electrode material with carbon as the main body has a bottleneck of theoretical capacity of 372 mAh/g, which cannot meet the requirement of high-power and high-energy density lithium batteries in the future.

Based on the above, high-capacity negative electrode material is a critical material of the high-energy lithium batteries. Researchers set forth that high gravimetric capacity (3,800 mAh/g) can be obtained by using a silica-based negative electrode material. However, the silica-based negative electrode material has a characteristic of high irreversible capacity, and may have a volume expansion of 400% after charge.

Specifically, during charge and discharge of the lithium battery, as the lithium ion intercalates/deintercalates the silica-based negative electrode material, material expansion and contraction occur on the silica-based negative electrode material, such that the silica-based negative electrode material is fractured, and the internal impedance is increased, thus reducing the usability of the lithium battery.

SUMMARY

Accordingly, the disclosure is directed to an energy storage composite particle, which has a specific structure, a high capacity, and good volume expansion/contraction characteristic.

The disclosure is further directed to a battery negative electrode material and a battery, which use the energy storage composite particle and have a high gravimetric capacity, a high coulomb efficiency, and a long cycle life.

An energy storage composite particle is provided. The energy storage composite particle includes a carbon film, a conductive carbon component, an energy storage grain, and a conductive carbon fiber. The carbon film surrounds a space. The conductive carbon component and the energy storage grain are disposed in the space. The conductive carbon fiber is electrically connected to the conductive carbon component, the energy storage grain, and the carbon film; and the conductive carbon fiber extends from the inside of the space to the outside of the space.

A battery negative electrode material is provided. The battery negative electrode material includes the above energy storage composite particle, a conductive carbon, and an adhesive, in which a weight ratio of the energy storage composite particle, the conductive carbon, and the adhesive is 75:15:10.

A battery is provided. The battery includes a negative electrode plate, a positive electrode plate, and an ion conduction layer. The battery negative electrode material is disposed on the negative electrode plate. The positive electrode plate is disposed correspondingly to the negative electrode plate. The ion conduction layer connects the negative electrode plate and the positive electrode plate.

Based on the above, the energy storage composite particle of the disclosure has a specific structure that the carbon film wraps the conductive carbon component and the energy storage grain. As the energy storage composite particle has enough space and apertures and buffers the volume expansion generated by the energy storage grain during charge is provided, thus preventing the energy storage composite particle from being fractured. Furthermore, the conductive carbon component, the conductive carbon fiber, and conductive matrix may form a three-dimensional conductive network, thus providing a good electron transmission path. Therefore, the energy storage composite particle has the advantages of long cycle life and high capacity.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

The disclosure provides an energy storage composite particle having a specific structure, which has the advantages of high gravimetric capacity, high coulomb efficiency, and long cycle life, and is applicable in manufacturing a battery having high capacity and good charge and discharge characteristics. Hereinafter, several embodiments are enumerated to describe the energy storage composite particle, and a battery negative electrode material and a battery using the energy storage composite particle of the disclosure.

Energy Storage Composite Particle

Figure 1:
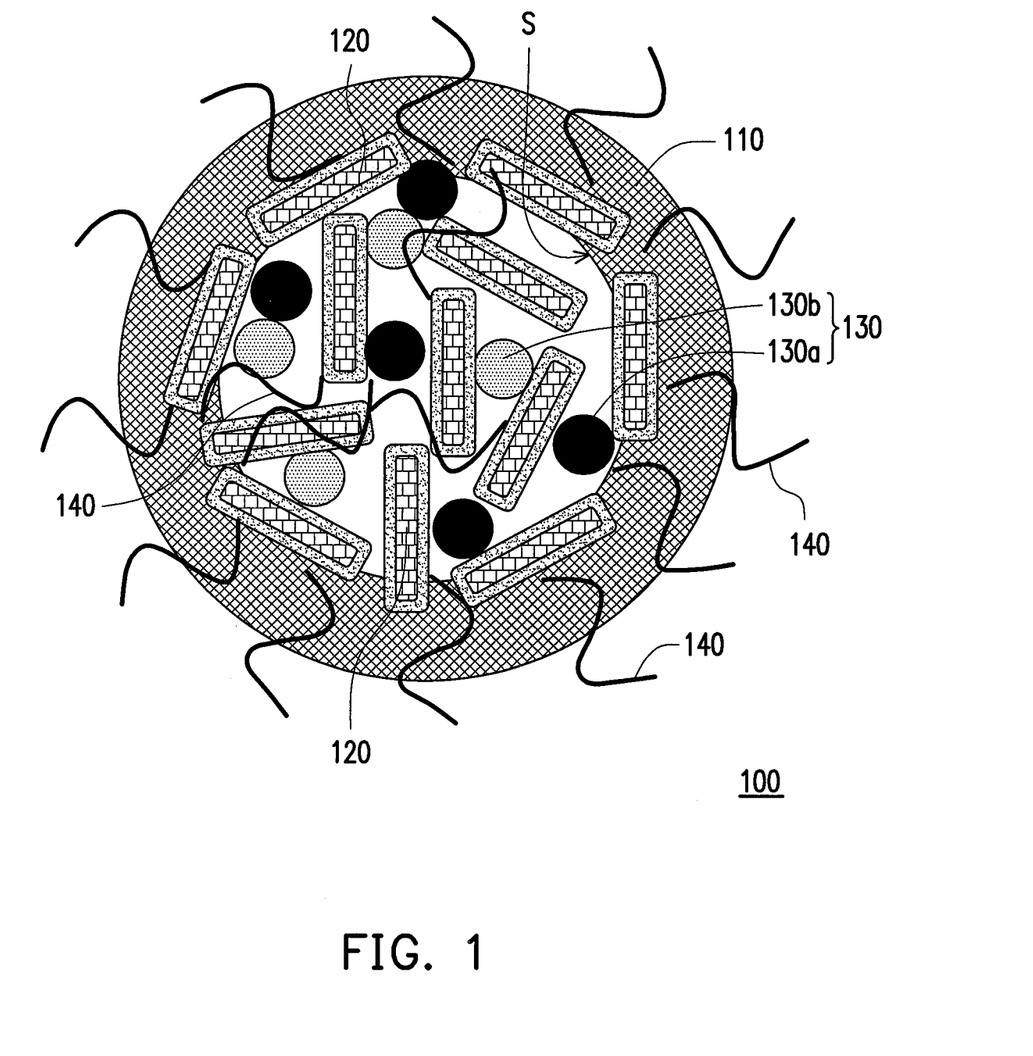
FIG. 1 is a schematic view of an energy storage composite particle according to an embodiment of the disclosure.

FIG. 1 is a schematic view of an energy storage composite particle according to an embodiment of the disclosure. Referring to FIG. 1, an energy storage composite particle 100 includes a carbon film 110, a conductive carbon component 120, an energy storage grain 130, and a conductive carbon fiber 140. The carbon film 110 surrounds a space S. The conductive carbon component 120 and the energy storage grain 130 are disposed in the space S. The conductive carbon fiber 140 is electrically connected to the conductive carbon component 120, the energy storage grain 130, and the carbon film 110, and the conductive carbon fiber 140 extends from the inside of the space S to the outside of the space S.

Specifically, a plurality of conductive carbon components 120 and a plurality of energy storage grains 130 are used to form a near-spherical micrometer particle (having a size of less than 15 μm), and the carbon film 110 is used to wrap the near-spherical micrometer particle. The conductive carbon fiber 140 grows out from surfaces of the conductive carbon component 120 and the carbon film 110 to form a conductive network. In this way, the energy storage composite particle 100 having a specific structure is obtained. As the energy storage composite particle 100 has a sufficient space S for buffering the volume expansion generated by the energy storage grain 130 during charge, the energy storage composite particle 100 will not be fractured after multiple cycles of charge and discharge.

Referring to FIG. 1, the thickness of the carbon film 110 may be less than 0.5 μm, and the material of the carbon film 110 may be asphalt carbide, resin carbide, or other suitable materials. The surface area of the energy storage composite particle 100 may be 6-15 $m^2/g$.

Furthermore, the size of the conductive carbon component 120 may be 1 μm-4 μm. Due to the micrometer-level size of the conductive carbon component 120, the particle will not easily to be aggregated during mixing the conductive carbon component 120 and the energy storage grain 130 (micrometer-level size). The conductive carbon component 120 may be flake graphite (having a good conductivity), for forming a good conductive network in the energy storage composite particle 100. The weight percentage of the conductive carbon component 120 may be 50-80 wt % based on the weight of the energy storage composite particle 100. By adjusting the weight percentage of the conductive carbon component 120, the conductivity of the formed conductive network may be appropriately controlled.

The size of the energy storage grain 130 may be 30 nm to 150 nm. The weight percentage of the conductive carbon grain 130 may be 10-50 wt % based on the weight of the energy composite particle 100. By adjusting the weight percentage of the energy storage grain 130, the energy storage composite particle 100 is enabled to have the required capacity.

The energy storage grain 130 may be selected from a nanometer silicon-based grain 130a, a nanometer heterogeneous composite grain 130b, and a combination thereof. Specifically, although the nanometer silicon-based grain 130a and the nanometer heterogeneous composite grain 130b co-exist as shown in FIG. 1, the nanometer silicon-based grain 130a and the nanometer heterogeneous composite grain 130b may be used alone.

When the energy storage grain 130 is the nanometer silicon-based grain 130a and the nanometer heterogeneous composite gain 130b, the weight percentage of the nanometer heterogeneous composite grain 130b may be 0.1 to 5.0 wt % based on the weight of the nanometer silicon-based grain 130a. By adjusting the weight percentage of the nanometer heterogeneous composite grain 130b based on the weight of the nanometer silicon-based grain 130a, the energy storage composite particle 100 is enabled to have high capacity and long cycle life.

The material of the nanometer heterogeneous composite grain 130b may be selected from Mg, Ca, Cu, Sn, Ag, Al, SiC, SiO, $TiO_2$, ZnO, Si—Fe—P, Si—P, Si—Fe, Si—Cu, Si—Al, Si—Ni, Si—Ti, Si—Co, and a combination thereof. It should be noted that, the nanometer heterogeneous composite grain 130b may use a metal (Mg, Ca, Cu, Sn, Ag, Al), or an alloy thereof, a silicon carbide (such as SiC), a silicon oxide (such as SiO), a metal oxide (such as $TiO_2$ and ZnO), a silicon phosphide (such as Si—P), a silicon-based metal phosphide (such as Si—Fe—P), or a composition of silicon and a metal (such as Si—Fe, Si—Cu, Si—Al, Si—Ni, Si—Ti, and Si—Co).

Specifically, the nanometer heterogeneous composite grain 130b may be formed by a heterogeneous substance (such as the composition of silicon and a metal), and the heterogeneous substance (metal) may increase the extensible structure and the conductivity of the silicon-based material. Taking the lithium battery as an example, during charge of the lithium battery, when the lithium ion intercalates the silicon-based material, to form a lithium-silicon alloy, the nanometer heterogeneous composite grain 130b generates volume expansion. However, due to the extensibility provided by the heterogeneous substance (metal), the stress change of the silicon-based material may be decreased, thus achieving an effect of avoiding the fracture of the nanometer heterogeneous composite grain 130b.

Figure 2:
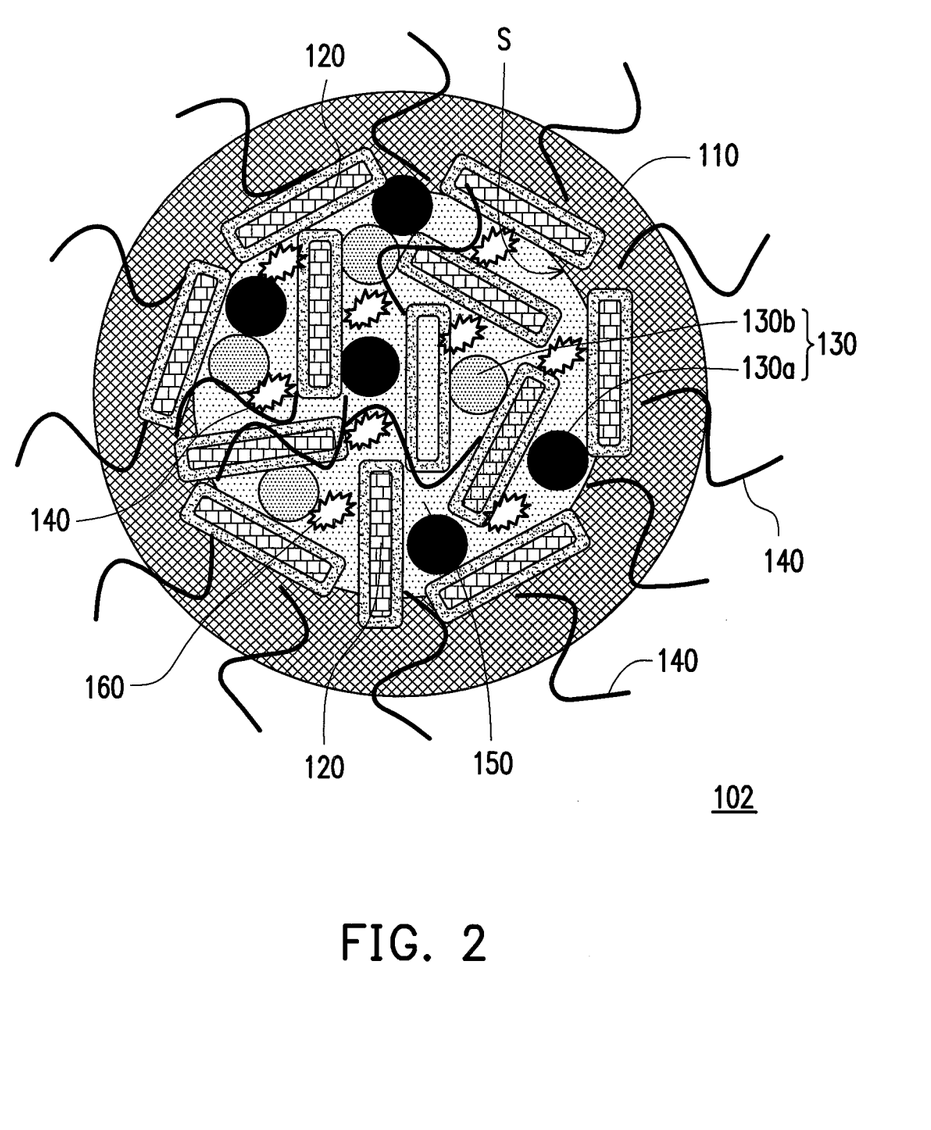
FIG. 2 is a schematic view of another energy storage composite particle according to an embodiment of the disclosure.

FIG. 2 is a schematic view of another energy storage composite particle according to an embodiment of the disclosure. Referring to FIG. 2, the energy storage composite particle 102 is similar to the energy storage composite particle 100, and the same component is shown with the same symbol. It should be noted that, the energy storage composite particle 102 in FIG. 2 may further include a conductive matrix 150, disposed in a space S.

Referring to FIG. 2 again, the conductive carbon component 120, the energy storage grain 130, and the conductive carbon fiber 140 are all distributed in the conductive matrix 150. The material of the conductive matrix 150 may be selected from a carbon material, a metal, an organic material, an inorganic material, and a combination thereof. A weight percentage of the conductive matrix 150 may be 5-10 wt % based on the energy storage composite particle 100. The conductive matrix 150 further electrically connects the conductive carbon component 120, the energy storage grain 130, the conductive carbon fiber 140, and the carbon film 110, thus reducing the surface resistance of the energy storage composite particle 102, and obtaining a high power characteristic.

The energy storage composite particle 102 may further include a plurality of apertures 160, disposed in the conductive matrix 150. The apertures 160 may further buffer the volume expansion of the energy storage grain 130, that is, the apertures 160 provide a buffer layer for the volume expansion of the high-capacity energy storage grain 130, such that the energy storage composite particle 100 will not easily to be fractured. The size of the apertures 160 may be in a range of 1 nm-1000 nm. Furthermore, the apertures 160 are beneficial to the introduction of the electrolyte and the quick entrance and exit of the ion, so as to provide a diffusion path for the ion. The apertures 160 further increase a surface area of the silica-based negative electrode material, thus increasing a reaction area of the ion.

Figure 3A:
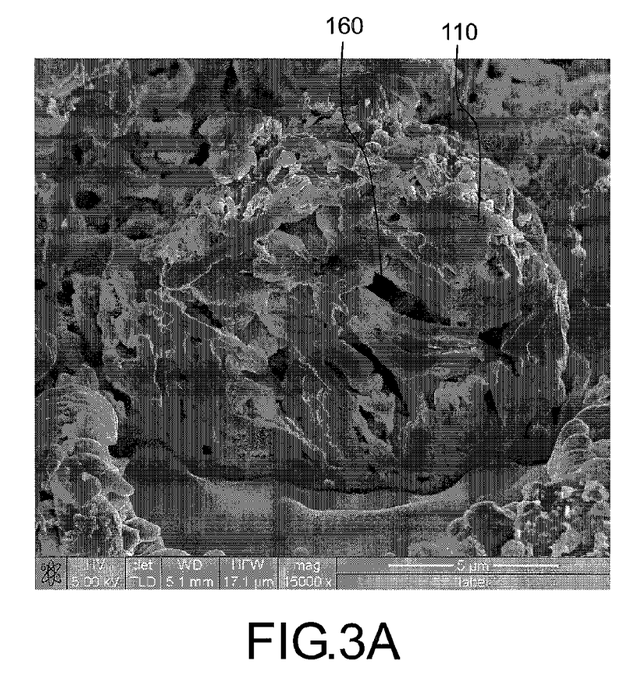
FIGS. 3A and 3B are focused ion beam equipped scanning electron microscope (FIB-SEM) photos of an energy storage composite particle according to an embodiment of the disclosure.
Figure 3B:
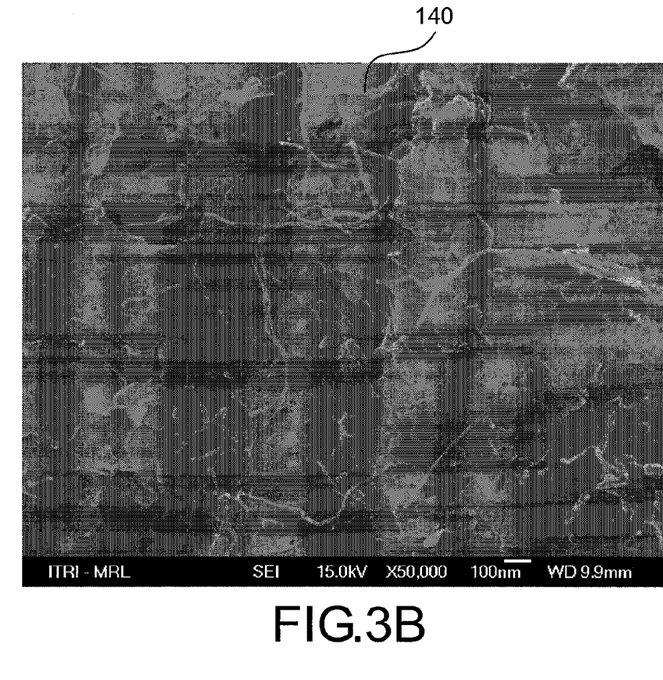

FIGS. 3A and 3B are focused ion beam equipped scanning electron microscope (FIB-SEM) photos of an energy storage composite particle according to an embodiment of the disclosure. Referring to FIG. 3A, a sectional plane of the energy storage composite particle is shown, and the composition of the energy storage composite particle is Example 7 (Si+SiC/Carbon).

The energy storage composite particle in FIG. 3A has a similar structure with that in FIG. 2, that is, the energy storage composite particle 102 has the plurality of apertures 160, and the surface of the energy storage composite particle 102 has the carbon film 110 which wraps the conductive carbon component, the energy storage grain, and the conductive matrix (not shown in FIG. 3A). As shown in FIG. 3B, a plurality of strip-shaped conductive carbon fibers 140 is formed on the surface of the carbon film 110, to form a conductive network.

It can be seen from FIGS. 2, 3A, and 3B that, the uniform energy storage composite particle 102 having a size of about 15 μm may be prepared. The inner part of the energy storage composite particle 102 is formed by a high-capacity silicon-based nanometer grain (energy storage grain 130), the conductive carbon fiber 140, flake graphite (the conductive carbon component 120), and the apertures 160 having a size distributed from several nanometers to micrometers. The surface of the energy storage composite particle 102 is covered by the carbon film 110 having the thickness of less than 500 nm and the conductive carbon fiber 140.

Based on the above, as the carbon film 110 surrounds the conductive carbon component 120 and the energy storage grain 130, when volume expansion occurs to the energy storage grain 130 during charge, the space S can provide a buffer effect, thus avoiding the fracture of the energy storage composite particle 100. When the energy composite particles 100 and 102 have the nanometer heterogeneous composite grain 130b and the aperture 160, due to the extensibility provided by the heterogeneous substance and the buffer space provided by the apertures 160, the effect of avoiding the fracture of the energy composite particles 100 and 102 is achieved. Furthermore, the conductive carbon component 120, the conductive carbon fiber 140, and the conductive matrix 150 can form a three-dimensional conductive network, thus improving the efficiency of electron transmission.

Battery Negative Electrode Material and Battery

Figure 4:
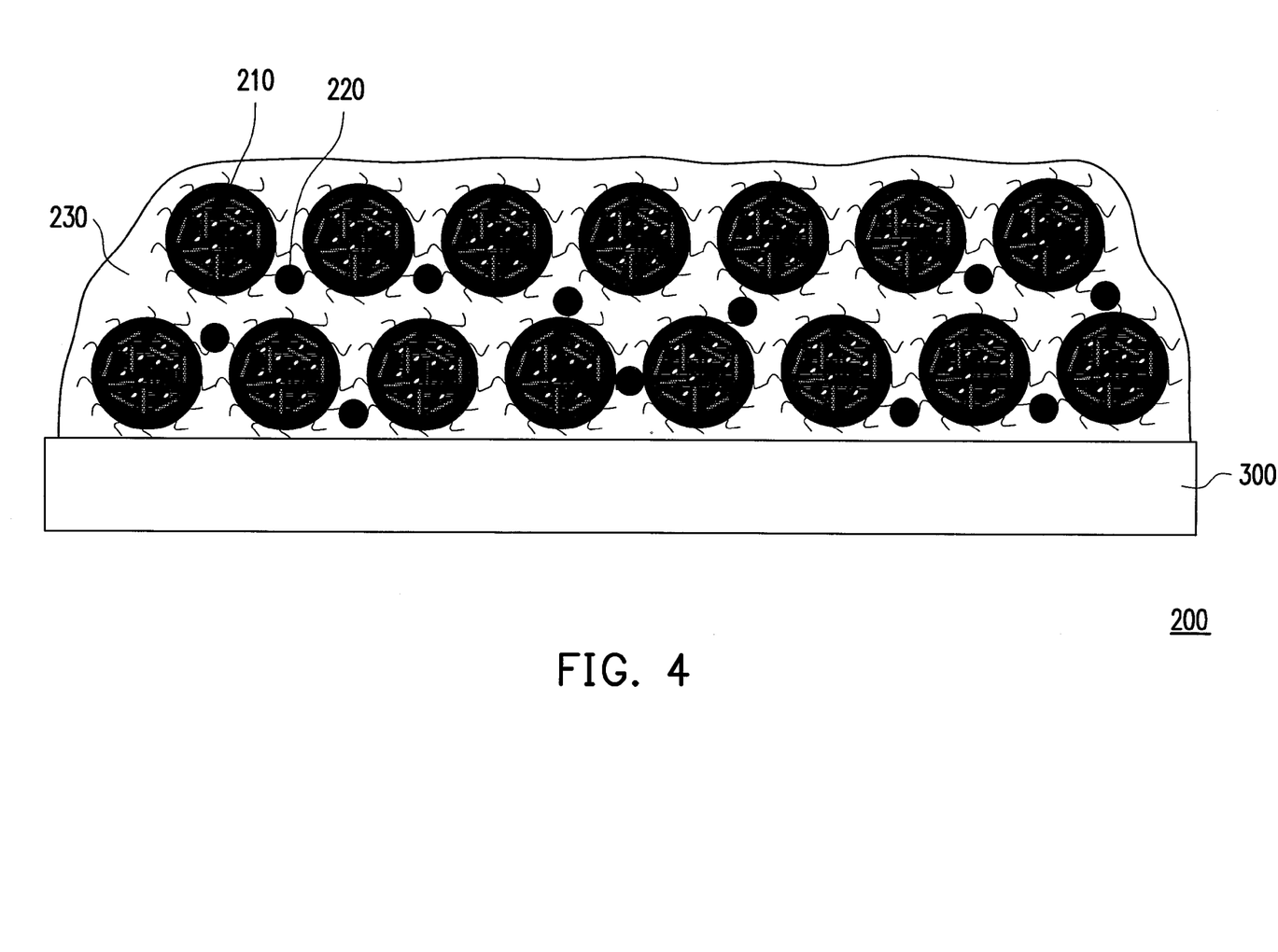
FIG. 4 is a schematic view of a battery negative electrode material according to an embodiment of the disclosure.

FIG. 4 is a schematic view of a battery negative electrode material according to an embodiment of the disclosure. Referring to FIG. 4, a battery negative electrode material 200 may be disposed on a metal plate 300, and may include an energy storage composite particle 210, a conductive carbon 220, and an adhesive 230. The energy storage composite particle 210 may be the energy storage composite particles 100 and 102, and the weight ratio of the energy storage composite particle 210, the conductive carbon 220, and the adhesive 230 may be 75:15:10. The adhesive 230 may include aqueous acrylate, for adhering the energy storage composite particle 210 and the conductive carbon 220. Furthermore, the metal plate 300 may use copper or other metals having good conductivity to collect current.

It should be noted that, a plurality of energy storage composite particles 210 may be electrically connected to one another through the carbon film 110 and the conductive carbon fiber 140, which is beneficial to increasing a contact area between the plurality of energy storage composite particles 210, so as to reduce the contact impedance between the plurality of energy storage composite particles 210, and achieve a high electron transmission capability.

Figure 5:
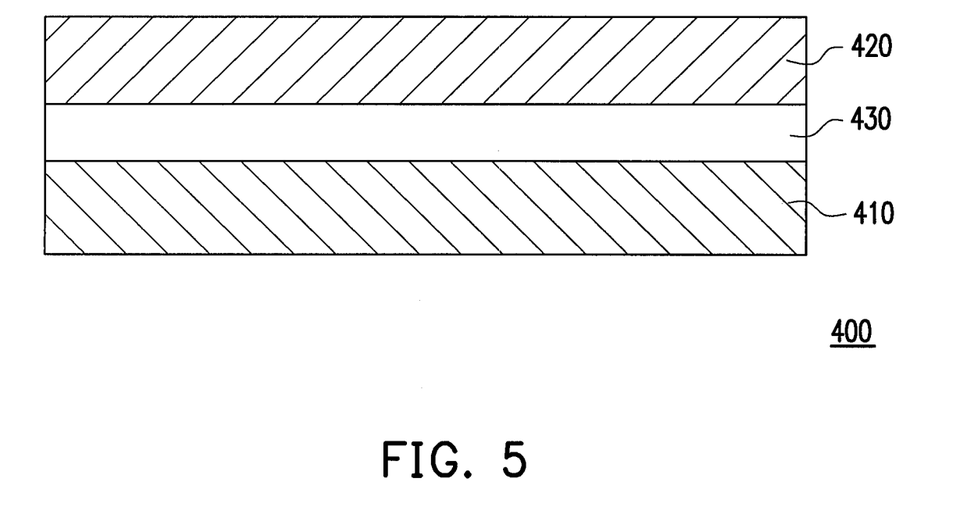
FIG. 5 is a schematic view of a battery according to an embodiment of the disclosure.

FIG. 5 is a schematic view of a battery according to an embodiment of the disclosure. Referring to FIG. 5, a battery 400 includes a negative electrode plate 410, a positive electrode plate 420, and an ion conductive layer 430. The battery negative electrode material 200 is disposed on the negative electrode plate 410. The positive electrode plate 420 is disposed correspondingly to the negative electrode plate 410. The ion conductive layer 430 is electrically connected to the negative electrode plate 410 and the positive electrode plate 420. The material of the positive electrode plate 420 may include lithium.

Several embodiments of the energy storage composite particles 100 and 102 of the disclosure are enumerated below, and are compared with two Comparative Examples of commercial carbon material (MCMB 1028) and Si/Graphite, to illustrate that the energy storage composite particles 100 and 102 actually have the advantages of a high gravimetric capacity, a high coulomb efficiency, and a long cycle life. Furthermore, fabrication embodiments using the battery negative electrode material of the energy storage composite particle are enumerated below.

Embodiments of Energy Storage Composite Particle of the Disclosure

Embodiment 1

Si/Carbon

High-capacity nanometer silicon and a carbon component were uniformly distributed under high-speed stirring. Next, a porous secondary particle was produced by using a spray granulation and mechanical device. Then, the surface of the porous secondary particle was wrapped with asphalt as a layer of uniform carbon precursor. Thereafter, a carbon film was wrapped outside through high-temperature (950° C.) carbonization treatment. Finally, the porous energy storage composite particle that is, Si/Carbon was obtained (Embodiment 1).

Embodiments 2 to 6

Si+Mg/Carbon, Si+Ca/Carbon, Si+Cu/Carbon, Si+Ag/Carbon, Si+Al/Carbon

High-capacity nanometer silicon and a carbon component were uniformly distributed under high-speed stirring, and then a dissolved metal precursor was slowly added, in which $Mg(NO_3)_2$ was added in Embodiment 2, $Ca(NO_3)_2$ was added in Embodiment 3, $Cu(CH_3COO)_2$ was added in Embodiment 4, $AgNO_3$ was added in Embodiment 5, and $Al(NO_3)_3$ was added in Embodiment 6.

Next, a porous secondary particle was produced by using a spray granulation and mechanical device. Then, the surface of the porous secondary particle was wrapped with asphalt as a layer of uniform carbon precursor. Thereafter, a carbon film was wrapped outside through high-temperature (800-1000° C.) carbonization treatment. Finally, the porous energy storage composite particle, that is, Si+Mg/Carbon, (Embodiment 2), Si+Ca/Carbon (Embodiment 3), Si+Cu/Carbon (Embodiment 4), Si+Ag/Carbon (Embodiment 5), and Si+Al/Carbon (Embodiment 6) was obtained.

Embodiment 7

Si+SiC/Carbon

High-capacity nanometer silicon and carbon were uniformly distributed under high-speed stirring. Next, a porous secondary particle was produced by using a spray granulation and mechanical device. Then, the surface of the porous secondary particle was wrapped with asphalt as a layer of uniform carbon precursor. A carbon film was wrapped outside through high-temperature (1100° C.) carbonization treatment. Finally, the porous energy storage composite particle, that is, Si+SiC/Carbon, was obtained (Embodiment 7).

Embodiments 8 to 9

Si+SiO/Carbon, Si+TiO2/Carbon

High-capacity nanometer silicon, a nanometer oxide, and a carbon material were uniformly distributed under high-speed stirring, in which the nanometer oxide added in Embodiment 8 was SiO, and the nanometer oxide added in Embodiment 9 was $TiO_2$.

Next, a porous secondary particle was produced by using a spray granulation and mechanical device. Then, the surface of the porous secondary particle was wrapped with asphalt as a layer of uniform carbon precursor. A carbon film was wrapped outside through high-temperature (1100° C.) carbonization treatment. Finally, the porous energy storage composite particle, that is, Si+SiO/Carbon (Embodiment 8), and Si+TiO2/Carbon (Embodiment 9), was obtained.

Embodiment 10

Si+SiFeP/Carbon

High-capacity nanometer silicon and carbon were uniformly distributed under high-speed stirring, and then an aqueous solution of a metal precursor (such as $C_6Fe_2O_{12} \cdot 5(H_2O)$) and phosphate solution were added slowly.

Next, a porous secondary particle was produced by using a spray granulation and mechanical device. Then, the surface of the porous secondary particle was wrapped with asphalt as a layer of uniform carbon precursor. Thereafter, a carbon film was wrapped outside through high-temperature (1000° C.) carbonization treatment. Finally, the porous energy storage composite particle, that is, Si+SiFeP/Carbon, was obtained (Embodiment 10).

Embodiment of Fabrication Method of Coin Cell of this Disclosure
Fabrication Process of Negative Electrode Plate Firstly, the energy storage composite particles of the Embodiments 1 to 10 were provided as the negative electrode material, an aqueous acrylate adhesive (LA132) and conductive carbon were added, in which the weight ratio of the energy storage composite particle, the aqueous acrylate adhesive, and the conductive carbon was 75:10:15. Next, a certain proportion of deionized water was added and mixed uniformly, to form a slurry. And then, the slurry was coated on a copper foil (14-15 μm), to form the negative electrode plate, and the negative electrode plate was dried with hot air, and then dried in vacuum, to remove the solvent.
Fabrication Process of Battery Before being assembled to the battery, the negative electrode plate was firstly rolled and then punched to a coin-type negative electrode plate having a diameter of 13 mm.

Next, as a positive electrode plate, lithium metal was disposed correspondingly to the negative electrode plate. An ion conductive layer was provided between the positive electrode plate and the negative electrode plate, for example, an electrolyte of 1M $LiPF_6$-EC/EMC/DMC (volume ratio is 1:1:1)+2 wt % VC was used, to finish the battery, wherein, the $LiPF_6$ is lithium hexafluorophosphate, EC is ethylene carbonate, EMC is ethyl methyl carbonate, DMC is dimethyl carbonat, and VC is vinylene carbonate.

The charge and discharge range of the battery is 2.0 V-5 mV. The charge and discharge current is 0.005 C, to measure various electrochemical properties of the material. The test condition of the cycle life is charge at 0.2 C/discharge at 0.5 C.

Comparative Example 1

The commercial graphite (MCMB 1028) was used to fabricate the coin cell and perform the tests.

Comparative Example 2

A nanometer silicon grain (50-150 nm), artificial graphite (1-4 μm), soft asphalt, and a solvent were uniformly mixed, and then subjected to wet-ball-milling for four days. Next, the solvent was removed, and the product was dried in vacuum. Finally, the powder was subjected to high-temperature (1000° C.) carbonization treatment, to obtain a porous Si/graphite composite anode material, for fabricating the coin cell and performing the tests.

Table 1 shows results of a cycle life test of Embodiments 1 to 10 and Comparative Examples 1 and 2, and FIGS. 6 to 17 are respectively views illustrating a relation of the final capacity and cycle times of Comparative Examples 1 and 2, and Embodiments 1 to 10.

TABLE 1

Results of a cycle life test of Embodiments 1 to 10 and Comparative Examples 1 and 2

| | Anode composite material | Charge capacity (mAh/g) | Discharge capacity (mAh/g) | Coulomb efficiency (%) | Cycle times | Final capacity (mAh/g) | Cycle retention rate |
|---|---|---|---|---|---|---|---|
| Comparative Example -1 | MCMB1021 | 343 | 304 | 89 | 100 | 210 | 70 |
| Comparative Example -2 | Si/Graphite | 486 | 449 | 92 | 100 | 253 | 56 |
| Embodimen-1 | Si/Carbon | 573 | 485 | 85 | 100 | 346 | 71 |
| Embodimen-2 | Si + Mg/Carbon | 666 | 527 | 79 | 100 | 360 | 68 |
| Embodiment-3 | Si + Ca/Carbon | 450 | 346 | 77 | 100 | 317 | 92 |
| Embodiment-4 | Si + Cu/Carbon | 700 | 586 | 84 | 100 | 430 | 73 |
| Embodiment-5 | Si + Ag/Carbon | 592 | 417 | 70 | 100 | 375 | 90 |
| Embodiment-6 | Si + Al/Carbon | 633 | 554 | 88 | 94 | 408 | 74 |
| Embodiment-7 | Si + SiC/Carbon | 547 | 486 | 89 | 200 | 317 | 65 |
| Embodiment-8 | Si + SiO/Carbon | 530 | 452 | 85 | 100 | 439 | 97 |
| Embodiment-9 | Si + TiO$_2$/Carbon | 670 | 535 | 80 | 100 | 424 | 79 |
| Embodimen-10 | Si + SiFeP/Carbon Si + SiFeP/Carbon | 555 | 445 | 80 | 200 | 341 | 77 |

Where, "cycle retention rate=(final capacity/discharge capacity)×100%", and a large value indicates a long cycle life; otherwise, a small value indicates a short cycle life.

Figure 6:
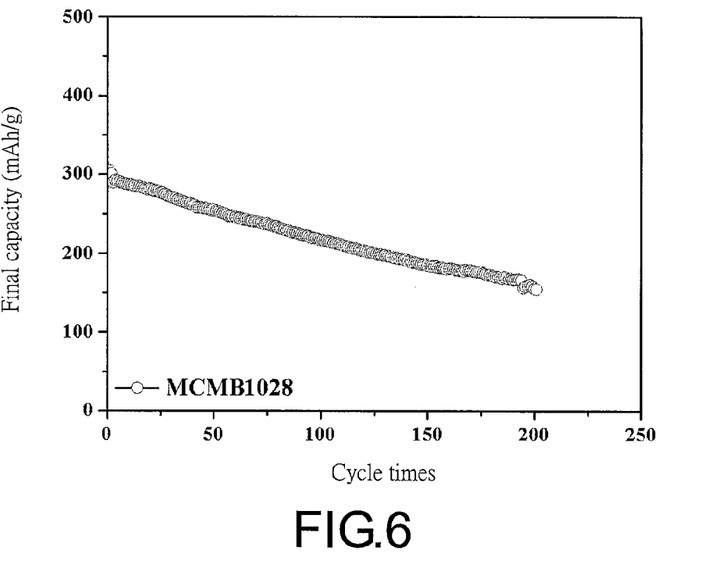
FIGS. 6 to 17 are views illustrating a relation of the final capacity and the cycle times in Comparative Examples 1 and 2, and Embodiments 1 to 10.

It can be know from Table 1 and FIG. 6 that, Comparative Example 1 is a commercial graphite having a discharge capacity of about 304 mAh/g, a coulomb efficiency of about 89%, and final capacity of 210 mAh/g, and the cycle retention rate is calculated to be 70% (100-times cycle).

Figure 7:
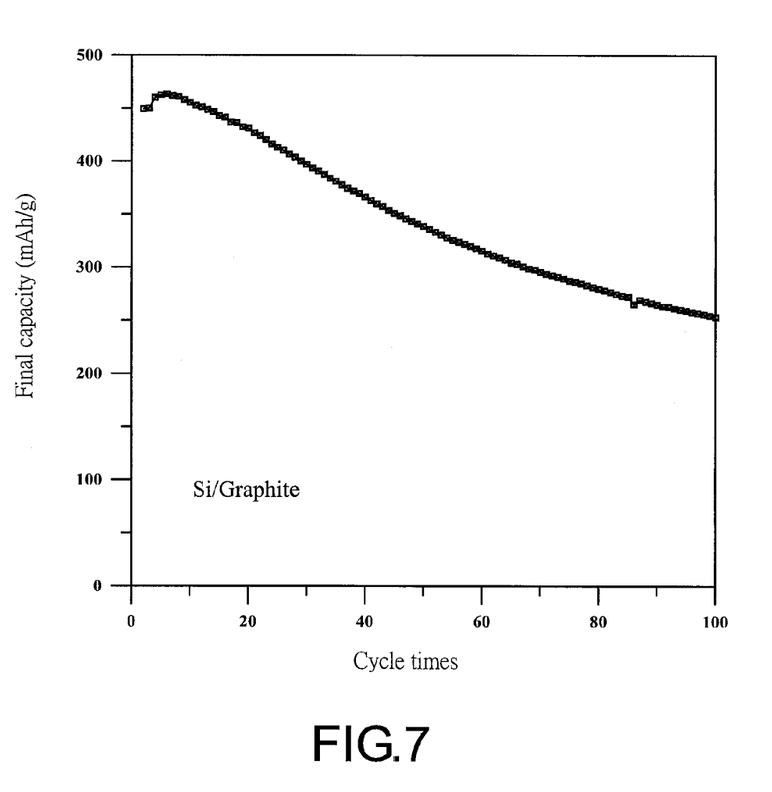

It can be know from Table 1 and FIG. 7 that, compared with the commercial graphite, the discharge capacity of Comparative Example 2 is improved by 45%, the coulomb efficiency is up to 92%, but the cycle retention rate is 56% (100-times cycle); therefore, the Comparative Example 2 is worse than Comparative Example 1.

Figure 8:
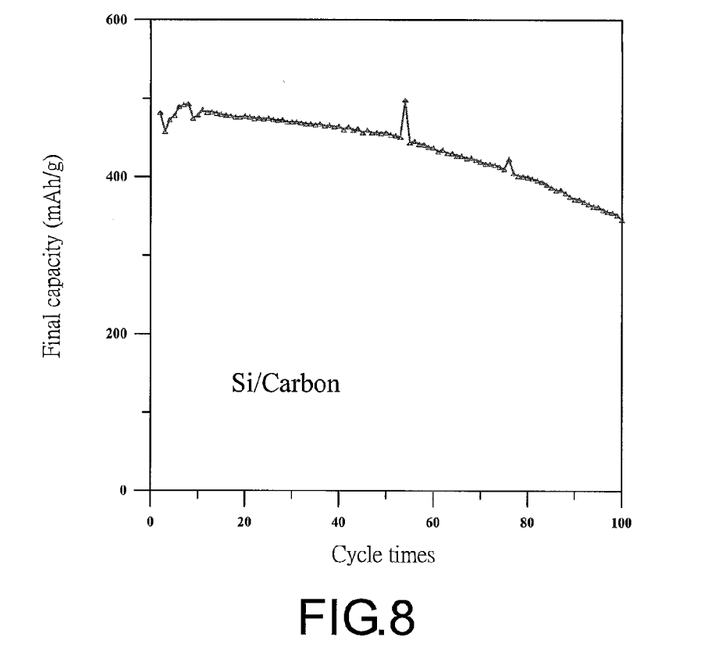
Figure 9:
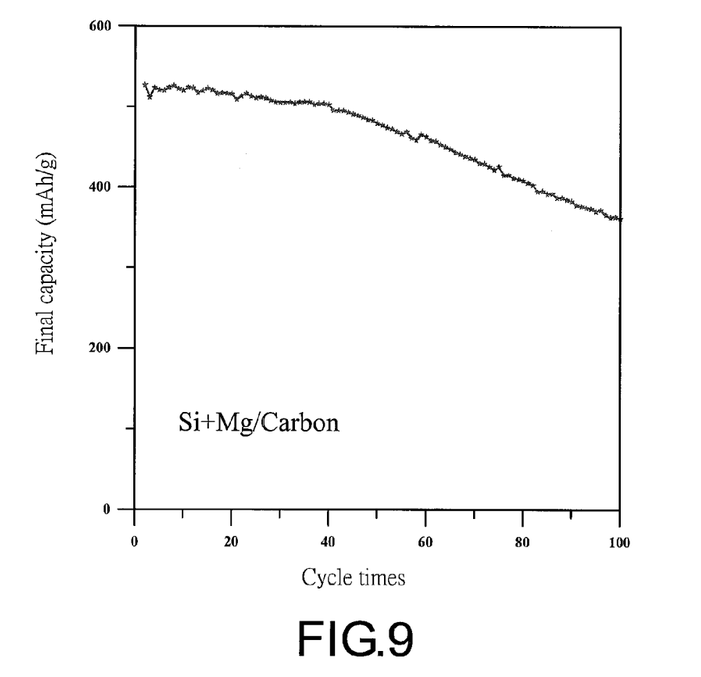
Figure 10:
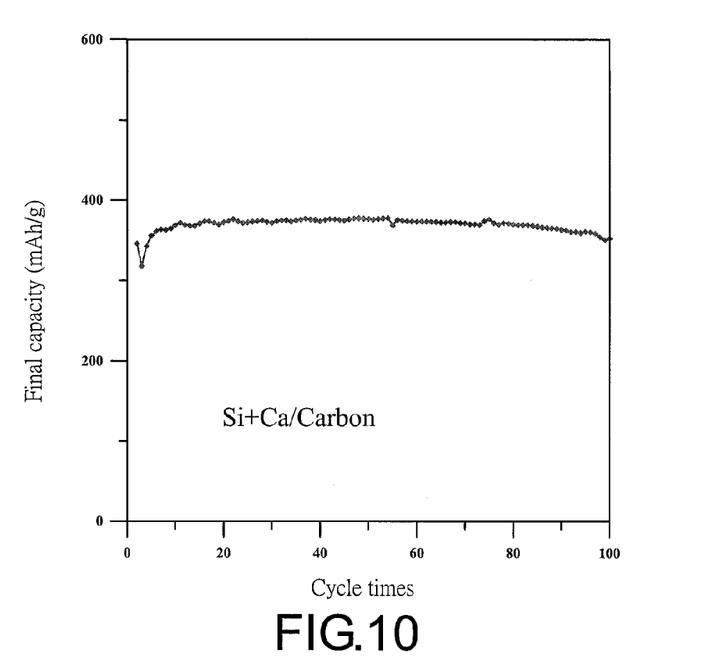
Figure 11:
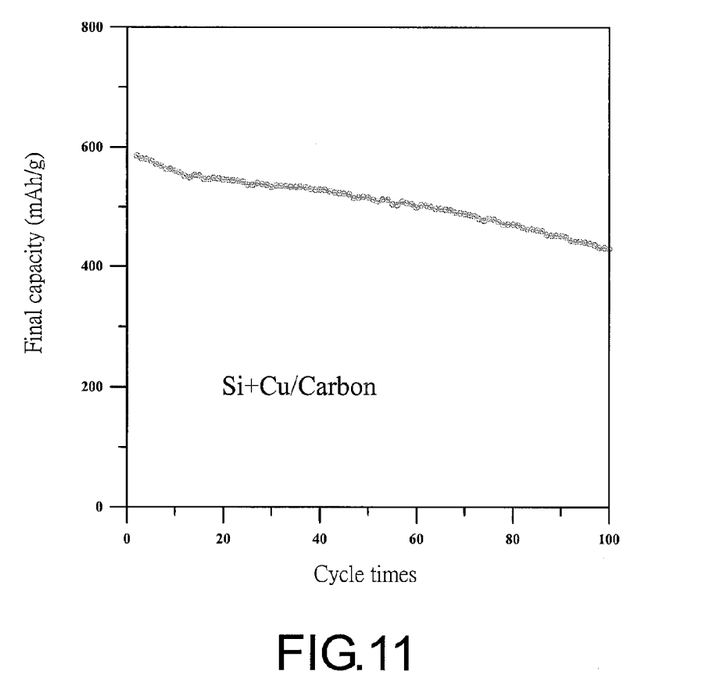
Figure 12:
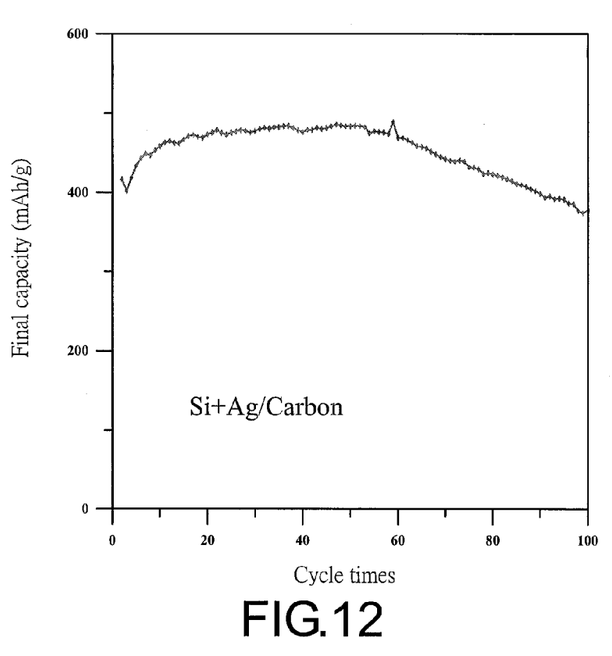
Figure 13:
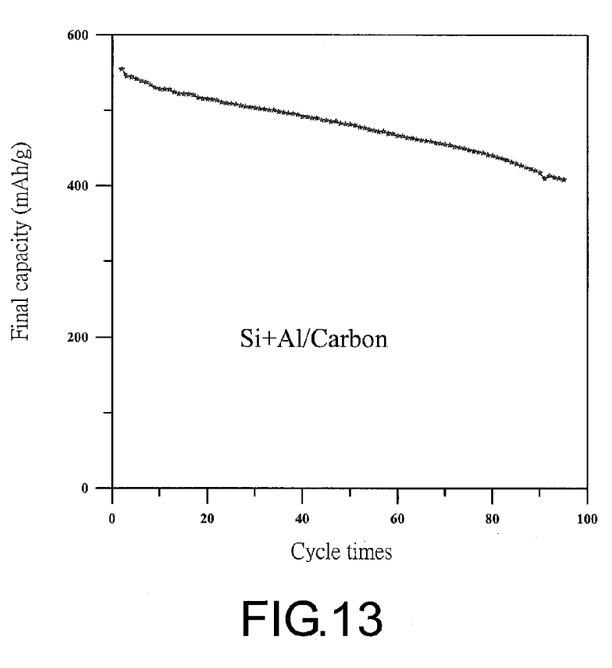

It can be know from Table 1 and FIG. 8 that, the energy storage composite particle (Si/Carbon) of Embodiment 1 has a superior exhibition, that is, has a high discharge capacity (485 mAh/g) and a high cycle retention rate 71% (100-times cycle). It can be know that, the energy storage composite particle (Si/Carbon) having an aperture structure has better exhibition in cycle life. The reason is that apertures in the structure of the energy storage composite particle provide a buffer space for the energy storage grain, which can effectively improve the cycle life.

It can be known from Table 1 and FIGS. 9 to 13 that, in the high capacity silicon-based/carbon material, if a metal heterogeneous substances is used for doping, the cycle retention rate of Embodiments 2 to 6 is respectively 68% (Si+Mg/Carbon, 100-times cycle), 92% (Si+Ca/Carbon, 100-times cycle), 73% (Si+Cu/Carbon, 100-times cycle), 90% (Si+Ag/Carbon, 100-times cycle), and 74% (Si+Al/Carbon, 94-times cycle). Compared with Comparative Example 2 (Si/graphite) and Embodiment 1 (Si/Carbon), the cycle life of Embodiments 3 to 6 is obvious long. Furthermore, the cycle life of Embodiment 2 (Si+Mg/Carbon) is similar to that of Embodiment 1 (Si/Carbon). On the whole, the high capacity silicon-based/carbon composite material is obviously improved by the doping of the metal heterogeneous substance. The reason is that as the metal has high conductivity and extensibility, the physical properties of the energy storage grain are improved.

Figure 14:
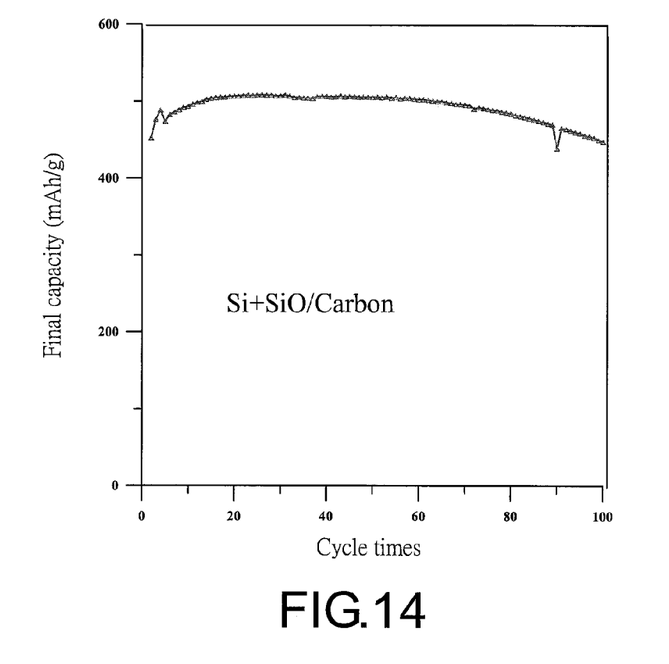
Figure 15:
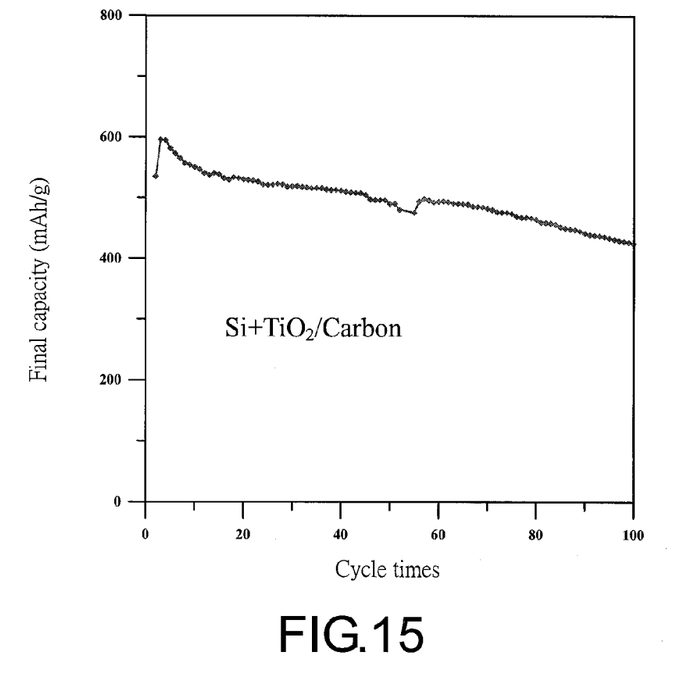

It can be know from FIGS. 14 and 15, in the high capacity silicon-based/carbon composite material, if the metal oxide heterogeneous substances is used for doping, the cycle retention rate of Embodiments 8 and 9 is 97% (Si+SiO/Carbon, 100-times cycle) and 79% (Si+TiO$_2$/Carbon, 100-times cycle) respectively. Compared with Comparative Example 2 (Si/graphite, 56%) and Embodiment 1 (Si/Carbon, 71%), it can be known that, the cycle life of Embodiments 8 to 9 is long. As the metal oxide may serve as the buffer layer for the expansion generated by the energy storage grain, a problem of fracture caused by the expansion of the energy storage grain is solved, thus obtaining a high and stable capacity.

Figure 16:
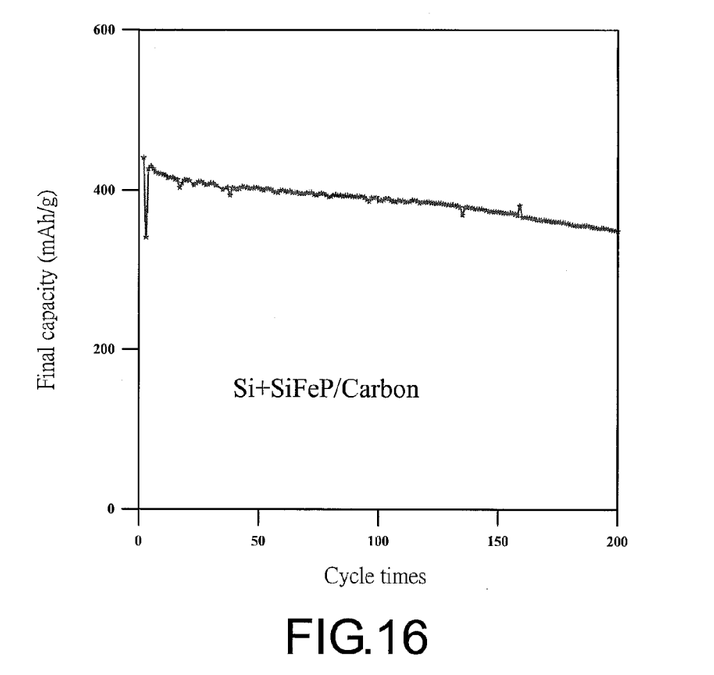
Figure 17:
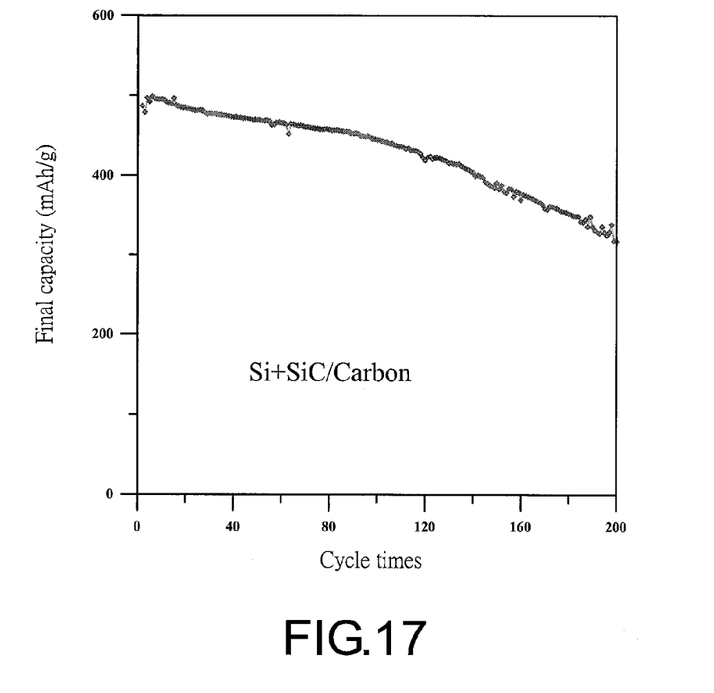

It can be known from Table 1 and FIG. 16 that, in a high capacity silicon-based/carbon composite material, if an alloy heterogeneous substances is used for doping, the cycle retention rate of Embodiment 10 is 77% (Si+SiFeP/Carbon, 200-times cycle). Compared with Comparative Example 2 (Si/graphite, 56%, 100-times cycle), Embodiment 1 (Si/Carbon, 71%, 100-times cycle), and Embodiment 7 (Si+SiC/Carbon, 65%, 200-times cycle) in FIG. 17, it can be known that the cycle life of Embodiment 10 is long. The silicon-based alloy heterogeneous substance may serve as the buffer layer for the expansion of the silicon-based material, and increase the extensible structure of the silicon-based material may be increased and improve the conductivity of the silicon-based material. Therefore, the electro transmission capability is increased, and the occurrence of silicon-based stress is reduced. As a result, that the problem of the expansion of the silicon-based material is solved, thus achieving a long cycle life. Furthermore, the Si+SiC/Carbon composite anode material in Embodiment 7 also has similar properties.

Based on the above, the energy storage composite particle, the battery negative electrode material, and the battery of the disclosure at least have the following advantages.

(1) The energy storage composite may have a plurality of apertures, which is beneficial to the introduction of the electrolyte and the quick entrance and exit of the ion, so as to provide a diffusion path for the ion. The apertures also increase a surface area of the energy storage composite particle, and may improve a reaction area of the ion. Furthermore, a plurality of apertures may provide a buffer layer for the expansion of the high capacity energy storage grain, such that the energy storage composite particle will not easily to be fractured.

(2) The energy storage grain may be a nanometer heterogeneous composite grain. The heterogeneous substance of the nanometer heterogeneous composite grain may increase the extensible structure and the conductivity of the energy storage grain, thus preventing the high capacity energy storage grain from being fractured during charge and discharge. Furthermore, the contact impedance between the energy storage grain and the conductive matrix can be reduced, which is beneficial to the stabilization of the cycle life of the energy storage composite particle.

(3) The conductive matrix is electrically connected to the energy storage grain, the conductive carbon, and the carbon film, thus forming a three-dimensional conductive network. The conductive carbon fiber may extend from inside of the energy storage composite particle to the outside, which is beneficial to reducing the contact impedance of the energy storage composite particle, so that the energy storage composite particle has superior electronic conductive path, thus obtaining a high power characteristic.

(4) A plurality of energy storage composite particles are electrically connected to one another by using the carbon film and the conductive carbon fiber, which is beneficial to increasing the contact area between the plurality of energy storage composite particles, reducing the contact impedance between the plurality of energy storage composite particles, thus obtaining a high electron transmission capability.

(5) The size of the conductive carbon component and the energy storage grain is respectively at the micrometer level and the nanometer level. The micrometer-level size of the conductive carbon component is beneficial to slurry mixing of the conductive carbon component and the energy storage grain, thus preventing the collection of particles.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An energy storage composite particle, comprising:
   a carbon film, surrounding a space;
   a conductive carbon component, disposed in the space;
   an energy storage grain, disposed in the space;
   a conductive matrix, disposed in the space;
   a plurality of apertures, disposed in the conductive matrix; and
   a plurality of conductive carbon fibers, electrically connected to the conductive carbon component, the energy storage grain and the carbon film, and a portion of the conductive carbon fibers are disposed in the space and another portion of the conductive carbon fibers are extended from the inside of the space to the outside of the space.

2. The energy storage composite particle according to claim 1, wherein the energy storage grain with a size of 30 nm to 150 nm is selected from a silicon-based nano-grain, a heterogeneous composite nano-grain, and a combination thereof.

3. The energy storage composite particle according to claim 2, wherein a material of the heterogeneous composite nano-grain is selected from Mg, Ca, Cu, Sn, Ag, Al, SiC, SiO, TiO2, ZnO, Si-Fe-P, Si-P, Si-Fe, Si-Cu, Si-Al, Si-Ni, Si-Ti, Si-Co and a combination thereof.

4. The energy storage composite particle according to claim 2, wherein the energy storage grain is a silicon-based nano-grain and a heterogeneous composite nano-grain, and a weight percentage of the heterogeneous composite nano-grain is 0.1-5.0 wt % based on a weight of the silicon-based nano-grain.

5. The energy storage composite particle according to claim 1, wherein a weight percentage of the energy storage grain is 10-50 wt % based on a weight of the energy storage composite particle.

6. The energy storage composite particle according to claim 1, wherein a weight percentage of the conductive carbon component is 50-80 wt % based on a weight of the energy storage composite particle.

7. The energy storage composite particle according to claim 1, wherein a material of the conductive matrix is selected from carbon, metal, an organic material, an inorganic material, and a combination thereof.

8. The energy storage composite particle according to claim 1, wherein a weight percentage of the conductive matrix is 5-10 wt % based on a weight of the energy storage composite particle.

9. The energy storage composite particle according to claim 1, wherein a material of the carbon film comprises asphalt carbide or resin carbide.

10. The energy storage composite particle according to claim 1, wherein a specific surface area of the energy storage composite particle is 6-15 $m^2/g$.

11. The energy storage composite particle according to claim 1, wherein the size of the apertures is in a range of 1 nm-1000 nm.

12. A battery negative electrode material, comprising:
   the energy storage composite particle according to claim 1;
   a conductive carbon; and
   an adhesive, wherein a weight ratio of the energy storage composite particle, the conductive carbon, and the adhesive is 75:15:10.

13. The battery negative electrode material according to claim 12, wherein the adhesive comprises aqueous acrylate.

14. A battery, comprising:
   an negative electrode plate, disposed with the battery negative electrode material according to claim 12;
   a positive electrode plate, disposed correspondingly to the negative electrode plate; and
   an ion conductive layer, electrically connected to the negative electrode plate and the positive electrode plate.

15. The battery according to claim 14, wherein a material of the positive electrode plate comprises lithium.

16. An energy storage composite particle, comprising:
   a carbon film, surrounding a space;
   a conductive carbon component, disposed in the space;
   an energy storage grain, disposed in the space; and
   a plurality of conductive carbon fibers, electrically connected to the conductive carbon component, the energy storage grain and the carbon film, and a portion of the conductive carbon fibers are disposed in the space and another portion of the conductive carbon fibers are extended from the inside of the space to the outside of the space,
   wherein the conductive carbon component, the energy storage grain and the conductive carbon fiber form a three-dimensional conductive network.

* * * * *